United States Patent [19]

Aizawa et al.

[11] Patent Number: 4,517,587
[45] Date of Patent: May 14, 1985

[54] SYNCHRONIZING SIGNAL GENERATING CIRCUIT FOR SOLID-STATE COLOR VIDEO CAMERA

[75] Inventors: Iwao Aizawa, Hiratsuka; Michio Masuda, Yokohama, both of Japan

[73] Assignee: Hitachi, Ltd., Tokyo, Japan

[21] Appl. No.: 436,360

[22] Filed: Oct. 25, 1982

[30] Foreign Application Priority Data

Oct. 26, 1981 [JP] Japan .................. 56-170017

[51] Int. Cl.³ .................. H04N 5/06; H04N 9/44
[52] U.S. Cl. .................. 358/17; 358/19; 358/150
[58] Field of Search .................. 358/150, 17, 19, 209, 358/212, 213

[56] References Cited

U.S. PATENT DOCUMENTS 4,038,683 7/1977 Thorpe et al. .................. 358/19
4,214,260 7/1980 Straaten .................. 358/17

FOREIGN PATENT DOCUMENTS 138412 10/1979 Japan .

Primary Examiner—John C. Martin
Assistant Examiner—Young S. Yu
Attorney, Agent, or Firm—Antonelli, Terry & Wands

[57] ABSTRACT

A synchronizing signal generating circuit generating a horizontal synchronizing signal applied to a solid-state color video camera comprises an oscillator generating an oscillation output signal having a frequency which is n (n: an integer) times as high as the horizontal frequency, a frequency divider dividing the frequency of the oscillation output signal from the oscillator to generate a pulse signal having a recurrence frequency equal to the horizontal frequency, and another oscillator generating, in response to the application of the pulse signal to its control terminal, a horizontal clock pulse signal whose oscillation phase is controlled to be maintained at the same fixed phase in each horizontal period.

4 Claims, 14 Drawing Figures

SYNCHRONIZING SIGNAL GENERATING CIRCUIT FOR SOLID-STATE COLOR VIDEO CAMERA

This invention relates to a synchronizing signal generating circuit for a color video camera employing a solid-state image sensing device and more particularly to a circuit generating horizontal clock pulses which are supplied to such a device for the purpose of horizontal scanning and which are stable in both the frequency and the phase.

A solid-state image sensing device includes photoelectric conversion elements such as photo diodes arranged in a two-dimensional pattern on the surface thereof or photoelectric conversion film deposited on the surface thereof, and signal sensors arranged in a two-dimensional pattern, so that light incident upon the surface of the device is subjected to photoelectric conversion, and that the optical information obtained by sequentially scanning the signal sensors in the horizontal and vertical directions can be derived as an electrical signal.

Therefore, in a video camera using such a solid-state image sensing device (which camera will be referred to hereinafter as a solid-state video camera), clock pulses having a frequency which is n times (n: an integer) as high as the horizontal frequency of a television signal are generally used as a clock pulse signal for driving the horizontal scanning circuit constituted by means such as shift registers and built in the solid-state image sensing device for the purpose of scanning the signal sensors arranged in the horizontal direction and sequentially deriving the electrical signal. In a color video camera, subcarrier pulses are required for the transmission of a chrominance signal. These pulses are produced in a synchronizing signal generating circuit.

Figure 1:
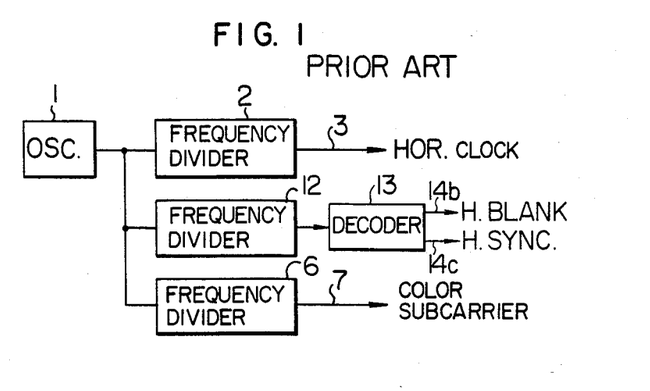
FIG. 1 is a block diagram showing the structure of a prior art synchronizing signal generating circuit for a color video camera.

FIG. 1 shows the structure of a prior art synchronizing signal generating circuit used in a solid-state color video camera of the NTSC system. According to the NTSC system, the frequency of the color subcarrier is set at 455/2 times as high as the horizontal frequency of television signals. Referring to FIG. 1, the output signal from an oscillator 1 oscillating at a frequency which is 910 times as high as the horizontal frequency generates a basic clock pulse signal, and the frequency of this basic clock pulse signal is divided by the factor of 4 by a frequency divider 6 to provide the color subcarrier 7. The frequency of the basic clock pulse signal generated from the oscillator 1 is also divided by the factor of 2 by another frequency divider 2 to provide the horizontal clock pulse signal 3. Synchronizing signals 14b and 14c are generated by both a frequency divider 12 for dividing the basic clock frequency by a factor of 910 and a decoder 13 for decoding the divided signal. Thus, in the prior art synchronizing signal generating circuit, it is customary to provide a single oscillator oscillating at the frequency (about 14.3 MHz) which is 910 times as high as the horizontal frequency, for the purpose of generating the signals above described. Such an oscillator and frequency dividers connected thereto can be realized by circuit elements commonly incorporated in household apparatus.

In most of solid-state image sensing devices presently developed for use for the NTSC system, the frequency of the horizontal clock pulse signal is selected to be 455 times as high as the horizontal frequency $f_H$ of television signals, and the number of horizontal picture elements (the number of photo diodes or signal sensors described hereinbefore) is limited to about 400 by decreasing the picture elements corresponding to the horizontal blanking period.

On the other hand, according to the PAL system generally adopted in European countries, the frequency of the color subcarrier is set at 709379/2500 times as high as the horizontal frequency of television signals. It is thus extremely difficult to use an oscillator, which is commonly incorporated in a household apparatus and which oscillates at a frequency n (n: an integer) times as high as the horizontal frequency as in the NTSC system, for the generation of the color subcarrier, because of requiring a high frequency oscillator of several GHz and a frequency divider operable at such a high frequency.

The number of horizontal picture elements in the solid-state image sensing device for a PAL video camera is preferable to be close to that for an NTSC video camera. The reason is described hereinbelow. The number of the picture elements should not be decreased for better picture resolutions. However, such a number of picture elements should not be increased in view of the productivity of the solid-state image sensing devices. In order to increase the number of picture elements, the pattern pitch of an IC mask for the image devices must be made smaller. In the modern techniques of fabricating semiconductor devices, however, it has not been possible to realize mass production of fine image sensing devices.

It is therefore an object of the present invention to provide a synchronizing signal generating circuit generating a horizontal synchronizing signal so as to enhance the stability of both of the subcarrier frequency and the horizontal frequency in a solid-state color video camera in which a solid-state image sensing device which has substantially the same number of horizontal picture elements in PAL video cameras can be used as in NTSC video cameras.

In accordance with the present invention, there is provided a synchronizing signal generating circuit for a solid-state color video camera comprising first oscillator means for generating an oscillation output signal having a frequency which is n (n: an integer) times as high as the horizontal frequency, and first frequency divider means for dividing the frequency of the oscillation output signal from the first oscillator means to produce a pulse signal having a frequency equal to that of the horizontal frequency, the circuit further comprising second oscillator means for generating a horizontal scanning clock pulse signal applied to a solid-state image sensing device the pulse signal having the frequency equal to the horizontal frequency being used to reset the oscillating operation of the horizontal-scanning clock pulse generating means, so that the horizontal scanning clock pulse signal can be controlled to be maintained at the same fixed phase in each horizontal period.

The above and other features of the present invention will become more apparent from the following detailed description of preferred embodiments thereof taken in conjunction with the accompanying drawings, in which:

FIG. 4b is a waveform diagram illustrating the operation of the circuit shown in FIG. 4a;

FIG. 7b is a waveform diagram illustrating the operation of the frequency divider shown in FIG. 7a;

Preferred embodiments of the present invention will now be described in detail.

Figure 2:
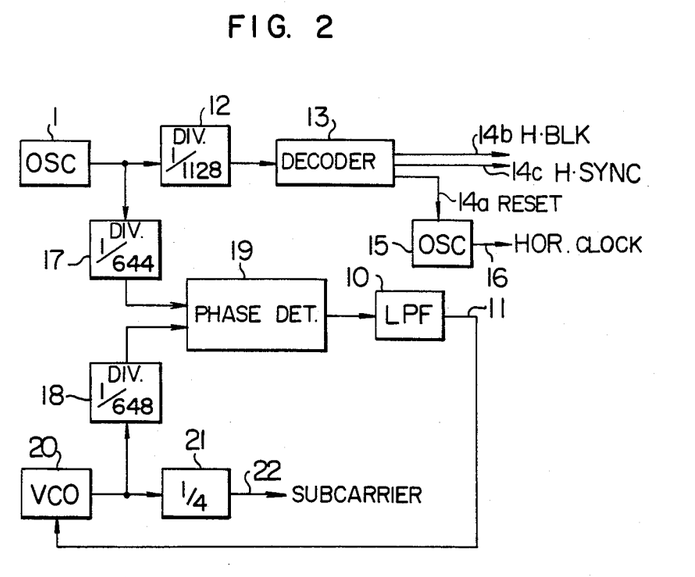
FIG. 2 is a block diagram showing the structure of a preferred embodiment of the synchronizing signal generating circuit according to the present invention.

FIG. 2 shows the structure of an embodiment of the synchronizing signal generating circuit according to the present invention. Application of the present invention to a PAL solid-state color video camera will be described while citing various practical numerical values.

Figure 3:
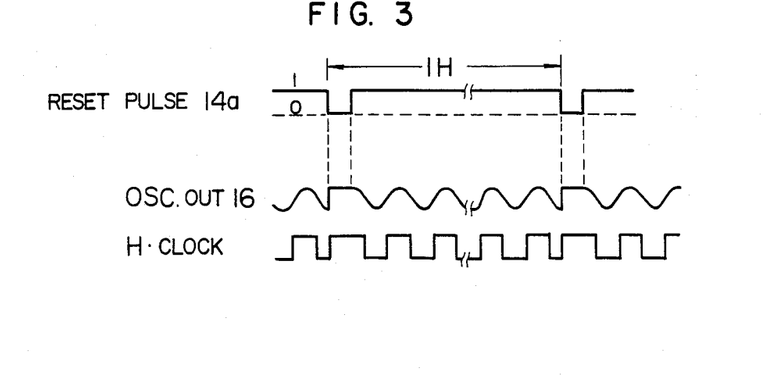
FIG. 3 is a waveform diagram illustrating the basic principle of horizontal clock pulse generation in the embodiment shown in FIG. 2.

Referring to FIG. 2, an oscillator 1 oscillates at a frequency of 17.625 MHz which is 1128 times as high as the horizontal frequency (referred to hereinafter as $f_H$), 15.625 kHz, of television signals. The oscillation output signal from the oscillator 1 is applied to a 1/1128 frequency divider 12 well known in the field of digital circuits, and the output signal from the frequency divider 12 is applied to a decoder 13 well known in the field of digital circuits to provide a pulse output signal having a frequency of $f_H$ as shown in FIG. 3. As shown by the blocks 12 and 13 in FIG. 4a, such a factor-of-n frequency dividing circuit is composed of a frequency divider and a decoder well known in the art. The frequency divider can divide the input frequency by the factors of $2^1$ to $2^m$ ($2^{m-1} < n \leq 2^m$), and the decoder includes the combination of, for example, AND gates and an OR gate. It is well known from literatures of digital art that the decoder can provide an output signal of any desired phase among those of input clock pulses numbered 0, 1, 2, ..., $2^m$. Various other frequency dividers are also commonly known, and various other decoders are also commonly known. For exmaple, IC's CD40161 and CD4028 made by the RCA Corporation have the functions of the frequency divider and decoder above described, respectively.

Figure 4A:
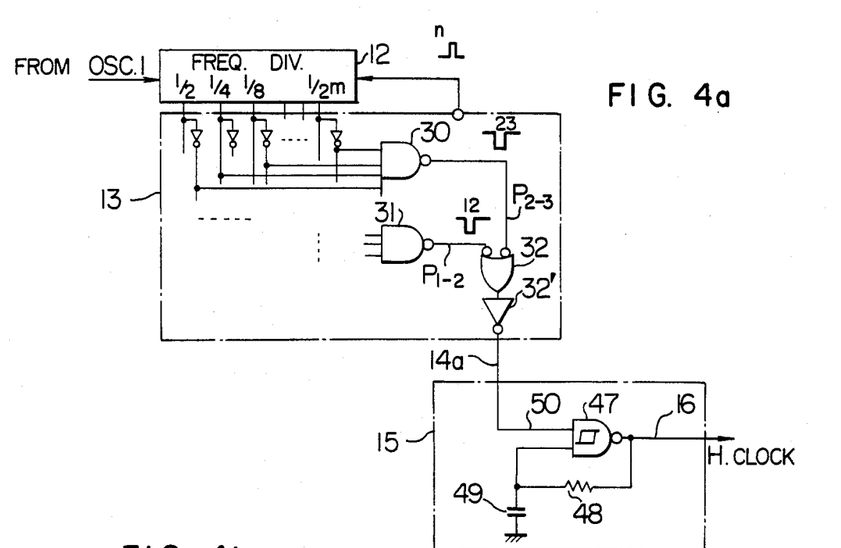
FIG. 4a is a circuit diagram of one form of the combination of the frequency divider, decoder and oscillator in FIG. 2 connected to generate the horizontal clock pulse signal.
Figure 4B:
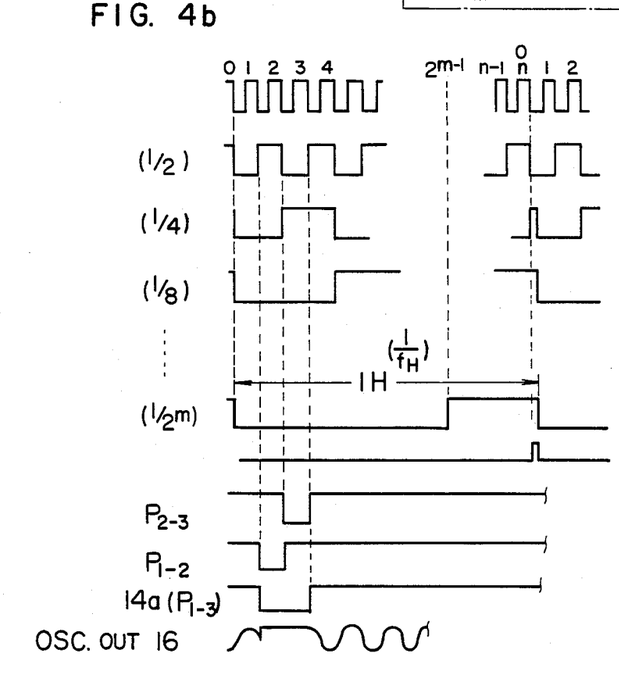

In response to the application of the input clock pulses to the frequency divider 12 shown in FIG. 4a, frequency-divided output signals obtained by frequency division by the factors of $2^1$ to $2^m$ appear from the frequency divider 12 to be applied to the decoder 13. In the decoder 13, two pulses $P_{1-2}$ and $P_{2-3}$ having the input clock timings 1-2 and 2-3 appear from two NAND gates 30 and 31 respectively and are applied to another NAND gate 32, and a pulse $P_{1-3}$ of desired timing 1-3 as shown in FIG. 4b appears from the gates 32 and 32'. At the predetermined timing of the n-th input clock pulse, the decoder 13 applies a reset pulse to the frequency divider 12. The frequency-divided output signals $\frac{1}{2}^1$ to $\frac{1}{2}^m$ from the frequency divider 12 drop to their low level as soon as the reset pulse is applied to the frequency divider 12, thereby completing one horizontal period. The symbol 1H in FIG. 4b represents one horizontal scanning period ($1/f^H$) which is 64 μs in the PAL system.

The phase locked loop included in the diagram shown in FIG. 2 and the production of the color subcarrier will then be described.

The frequency of the oscillation output signal from the oscillator 1 is divided by the factor of 644 by another frequency divider 17 shown in FIG. 2, and the output signal from this frequency divider 17 is applied as one of two inputs to a phase detector 19. Another oscillator 20 is provided for generating the color subcarrier. This oscillator 20 is a voltage controlled oscillator (VCO) whose oscillation frequency is made variable by a d.c. voltage applied from an external source. The frequency of the oscillation output signal from the oscillator 20 is divided by the factor of 648 by another frequency divider 18, and the output signal from this frequency divider 18 is applied as the other input to the phase detector 19. The output signal from the phase detector 19 is applied to a low-pass filter 10, and the output signal from the low-pass filter 10 is applied to the oscillator 20 as an oscillation frequency controlling voltage 11. Thus, a phase locked loop known in the art is constituted so that the oscillation frequency of the oscillator 20 can be stabilized. In FIG. 2, the center frequency $\bar{f}_{20}$ of the oscillation output signal from the oscillator 20 is controlled to be $$\bar{f}_{20} = \frac{17.625}{644} \times 648 \approx 17.734472 \text{ (MHz)},$$

and the frequency of the oscillation output signal from the oscillator 20 is divided by the factor of 4 by another frequency divider 21 to produce the color subcarrier 22. In this case, the center frequency $\bar{f}_{sc}$ of the subcarrier 22 is $$\bar{f}_{sc} = \frac{f_{20}}{4} = 4.433618 \text{ (MHz)}$$

In the PAL system, the frequency of the subcarrier is set at 4.43361875 MHz. However, the above difference of only about 0.75 kHz in the center frequency of the subcarrier does not pose any practical problem. Further, frequency variations of the output signal from the oscillator 1 or frequency variations of the subcarrier attributable to the control characteristic of the phase locked loop can be easily suppressed by the modern circuit technique so as to be practically negligible.

The horizontal clock pulse generating circuit will next be described. Referring to the embodiment of a PAL system shown in FIG. 2, let us consider to obtain a horizontal clock pulse by dividing the oscillation frequency of the oscillator 1 which oscillates at an integer multiple of the horizontal frequency as carried out in the prior art NTSC circuit shown in FIG. 1. It is preferable to set the frequency of the horizontal clock pulse at 564 times as high as the horizontal frequency $f_H$ obtained by dividing the output of the oscillator 1 by a factor of 2 so as to substantially equalize the number of picture elements of the PAL system to that of the NTSC system. In the case of reducing the number of picture elements by the number corresponding to a horizontal blanking period of about 12 μs in the PAL system, the resultant number of required horizontal picture elements is about 460. It is difficult to set the oscillation frequency of the oscillator 1 at other than 564·$f_H$ or at an integer multiple thereof, a half or a quarter thereof in the circuit configuration while establishing a specific relation between the horizontal frequency and the subcarrier frequency in the PAL system. Because the division factors of the frequency dividers 17 and 18 need to be set at higher values than 644 and 648, respectively in order to set the oscillation frequency of the oscillator 1 at a frequency other than 1128·$f_H$ with a deviation accuracy of the center frequency of the subcarrier signal enough to be available in the video camera of the PAL system. To set the factors at such high values results in less controllability of the phase lock loop or less stability of the subcarrier frequency. Accordingly, the frequency of the oscillator 1 is set at the value of 1128·$f_H$, and thus the number of horizontal picture elements of the image sensing unit needs to be increased in the PAL system shown in FIG. 2.

The reason why the value n·$f_H$ (n: an integer), namely an integer multiple of the horizontal frequency $f_H$ is used as the frequency of the horizontal clock pulse signal is now described.

An image signal appears from the solid-state image sensing unit in synchronous relation with the horizontal clock pulse signal. Thus, the phase of the horizontal clock pulse signal relative to the horizontal period of the television signal determines the position of the picture on the screen of a cathode-ray tube of, for example, a monitor television receiver when the image picked up by the camera is reproduced on the screen of the CRT. Therefore, a variation of the phase of the horizontal clock pulse signal relative to the horizontal period of the television signal results in a shift of the position of the reproduced picture on the screen of the CRT, and the quality of the reproduced picture becomes unsightly. To avoid such a tendency, the frequency of the horizontal clock pulse signal is selected to be integer times as high as $f_H$ thereby preventing the undesirable phase variation as will be described now with reference to FIGS. 5a and 5b.

Figure 5A:
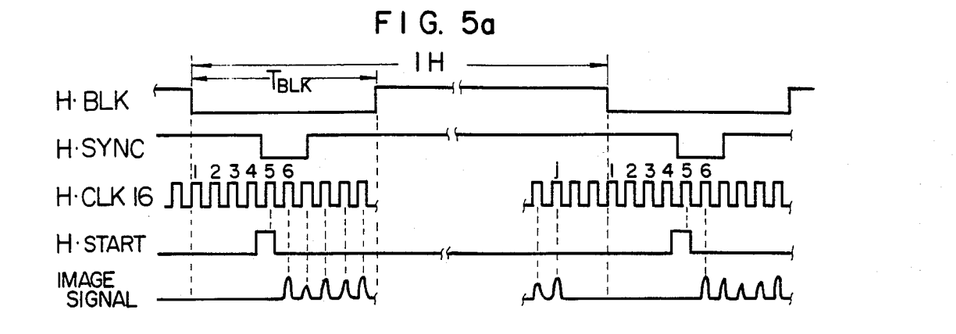
FIGS. 5a to 5d and waveform diagrams illustrating the horizontal clock pulse signal generated by the circuit according to the present invention.

The oscillation output signal from the oscillator 1 shown in FIG. 1 is passed through the frequency divider 12 and decoder 13 to produce the signals including the horizontal blanking pulse signal and horizontal synchronizing pulse signal required for the television signal. Such signals are shown in FIG. 5a. Both of the horizontal blanking pulse signal and the horizontal synchronizing pulse signal have the same recurrence frequency $f_H$. In FIG. 5a, the symbol $T_{BLK}$ indicates the horizontal blanking period, and H.CLOCK indicates the horizontal clock pulse signal 3 generated from the frequency divider 2 shown in FIG. 1. In FIGS. 5a to 5d, the pulse width of the horizontal clock pulse is enlarged relative to that of the horizontal blanking pulse or horizontal synchronizing pulse for ease or convenience of explanation.

In the solid-state image sensing device, a start pulse is required for determining the timing of starting reading of information from the horizontal picture elements, that is, the timing of starting the operation of the horizontal scanning circuit of the device. In order that the horizontal scanning circuit can stably operate, it is required that the start pulse is strictly synchronized or in phase with the horizontal clock pulse signal. This start pulse is generally obtained by dividing the frequency of the horizontal clock pulse signal. In FIG. 1, the horizontal clock pulse signal 3 is applied to a frequency divider (not shown) to obtain the start pulse. The frequency divider generates the start pulse at the phase of an k-th (k: a predetermined number) horizontal clock pulse counting from the starting phase of the horizontal blanking period $T_{BLK}$, that is, the phase at which the horizontal blanking pulse turns into its "0" level from its "1" level. The start pulse thus generated is shown in FIG. 5a. FIG. 5a illustrates that the start pulse is generated at the phase of the 5th (k=5) horizontal clock pulse counting from the phase at which the horizontal blanking pulse turns into its "0" level from its "1" level.

In response to the application of the start pulse to the solid-state image sensing device, the operation of the horizontal scanning circuit in the device is started, and, from the time corresponding to, for example, the 6th horizontal clock pulse in FIG. 5a, the image signal stored in the picture elements is generated in synchronism with the horizontal clock pulse signal. In this manner, the information is sequentially read out from the picture elements until finally the last picture element is read out in synchronism with the j-th horizontal clock pulse. Generally, the horizontal scanning circuit in the solid-state image sensing device has only the function of scanning as many picture elements as the array of the picture elements. Therefore, after the last picture element is read out, the horizontal scanning circuit ceases its operation and remains inactive until the next start pulse is applied, even when the application of the horizontal clock pulse signal continues.

Since the frequency of the horizontal clock pulse signal is integer times as high as the horizontal scanning frequency $f_H$, the phase of the horizontal clock pulse signal relative to that of the horizontal blanking pulse signal or horizontal synchronizing pulse signal in FIG. 5a is maintained constant. In this case, horizontal scanning in, for example, a television receiver connected to the video camera is synchronized with the horizontal synchronizing pulse signal. In that case, therefore, the image output signal from the picture elements of the solid-state image sensing device is applied to appear at a fixed position on the screen of the CRT of the television receiver, and no horizontal shift of the reproduced picture occurs.

Figure 5B:
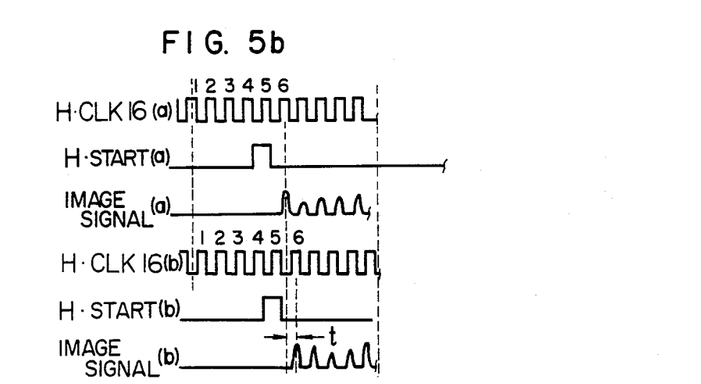

Description will next be directed to the picture display in which the ratio between the frequency of the horizontal clock pulse signal and the horizontal scanning frequency $f_H$ is not an integer. FIG. 5b shows the waveforms of a horizontal clock pulse 16(a), a horizontal start pulse (a) and an image signal (a), and thereunder the waveforms of a horizontal clock pulse 16(b), a horizontal start pulse (b) and an image signal (b) appearing after one horizontal scanning period 1H. In order to clarify the phase of the horizontal clock pulse signal relative to the horizontal synchronizing signal, a pulse waveform of the signal and a successive pulse waveform below the former are shown in FIG. 5b, and vertical broken lines indicating the horizotnal synchronizing period are depicted in each of FIGS. 5a and 5b.

Suppose that, in a horizontal scanning period, the phase of the horizontal clock pulse signal relative to that of the horizontal blanking signal is as shown on the upper side of FIG. 5b. Since the frequency of the horizontal clock pulse signal is not integer times as high as $f_H$, the phase of the horizontal clock pulse signal relative to that of the horizontal blanking signal in the next horizontal scanning period will be as, for example, shown on the lower side of FIG. 5b. Consequently, the two phases of the output signal from the image sensing device relative to the two continuous horizontal synchronizing pulses will deviate by time t as shown in FIG. 5b, and the picture portions displayed on the screen of the CRT of the television receiver will be shifted in the horizontal direction between the two adjacent horizontal scanning lines. If the frequency of the horizontal clock pulse signal is (an integer plus 0.5) times as high as the horizontal scanning frequency $f_H$, the picture portion displayed on the screen of the CRT will be shifted in the horizontal direction by the time corresponding to a half of the interval between the picture elements of the image sensing device for each horizontal scanning line. Therefore, when an object having a straight contour in the vertical direction is picked up by the video camera, the contour line of the picture displayed on the screen of the CRT will become non-straight or uneven depending on the scanning lines. Further, when the frequency of the horizontal clock pulse signal deviates slightly from the value which is the integer times as high as $f_H$, the contour line will shift slightly for each scanning line until it takes a saw-tooth like form since, after scanning by a certain number of scanning lines, the contour line will abruptly shift leftward or rightward by the time corresponding approximately to the interval between the picture elements. Such picture misalignment occurs regularly with time and is very conspicuous to the eye so that the viewer cannot enjoy a beautiful picture.

Accordingly, the output of the prior art oscillator 1 is used as a common basic clock signal as shown in FIG. 1, and the frequency of the horizontal clock pulse is always adjusted to the value of an integer multiple of horizontal frequency such as the horizontal synchronous signal or the horizontal blanking pulse. As described above, the number of horizontal picture elements of image sensing unit need to be increased to obtain a horizontal clock pulse by dividing the frequency of the output of oscillator 1 in the configuration of FIG. 2 in the PAL video camera. According to the present invention, a solid-state video camera of the PAL system using an image sensing device including substantially the same number of horizontal picture elements as compared with the NTSC system is realized as described below.

FIG. 3 is a waveform diagram illustrating the operation of the horizontal clock pulse generating circuit. The pulse signal 14a of frequency $f_H$ obtained in the aforementioned manner is applied to another oscillator 15 generating horizontal clock pulses. The waveform of the output signal 16 from this oscillator 15 is also shown in FIG. 3. The oscillator 15 shown in FIG. 2 is constructed so that it oscillates when the pulse signal 14a (referred to hereinafter as a reset pulse signal) is in its "1" level and it creases its oscillating operation when the reset pulse signal 14a turns into its "0" level. When so constructed, the oscillation output signal 16 from the oscillator 15 has the waveform shown in FIG. 3. This waveform of the oscillation output signal 16 is then shaped by a known digital circuit such as an inverter circuit (not shown in FIG. 2) to provide a horizontal clock pulse signal H.CLOCK.

As a separate oscillator for horizontal clock pulse is used in this circuit configuration, the frequency of the horizontal clock pulse may be freely set, consequently the number of the horizontal picture elements of the solid-state image sensing device may be freely selectable. It is not avoidable that the oscillation frequency by the oscillator 15 is deviated from its initially set value with surrounding temperature in the circuit configuration shown in FIG. 1. But the picture deviation on the screen as explained with FIG. 5b is not generated according to one embodiment of the present invention even if the oscillation frequency of the oscillator 15 deviates or, even if the oscillation frequency by the oscillator 15 is set at a value other than an integer multiple of the horizontal frequency, as described below.

Figure 5C:
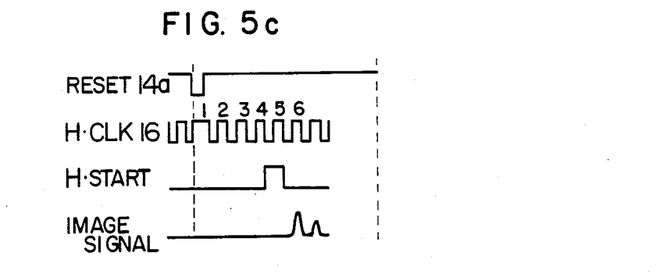

The horizontal blanking pulse signal 14b and horizontal synchronizing pulse signal 14c are generated from the decoder 13 shown in FIG. 2 together with the reset pulse signal 14a. Reference is to be made to FIGS. 5a and 5c for the relation between the phase of the horizontal blanking pulse signal 14b or horizontal synchronizing pulse signal 14c and that of the reset pulse signal 14a. The horizontal clock pulse signal 16 derived from the circuit shown in FIG. 2 and having the waveform shown in FIG. 3 is also shown in FIG. 5c. The start pulse and image signal are also shown in FIG. 5c. As described already with reference to FIG. 3, the phase of the horizontal clock pulse numbered 1 in FIG. 5c is controlled by the reset pulse 14a to be maintained constant in each horizontal period. Therefore, even when the frequency of the horizontal clock pulse signal 14c is not integer times as high as $f_H$, no variation occurs in the phase of the third pulse and the image output signal relative to that of the horizontal synchronizing pulse signal. The same applies to the next horizontal period, and no illustration is necessary. In a strict sense, the phase of the horizontal clock pulse signal may be slightly shifted due to a variation of the ambient temperature, as is commonly known in the field of digital circuits, when the oscillating operation of the oscillator 15 shown in FIG. 2 is controlled by the reset pulse signal 14a. However, it is not probable that the ambient temperature makes an abrupt rise and an abrupt drop repeatedly in the environment in which a video camera is operated. Therefore, a phase shift as described above does not lead to display of a non-beautiful picture on the screen of the CRT of the television receiver.

Figure 5D:
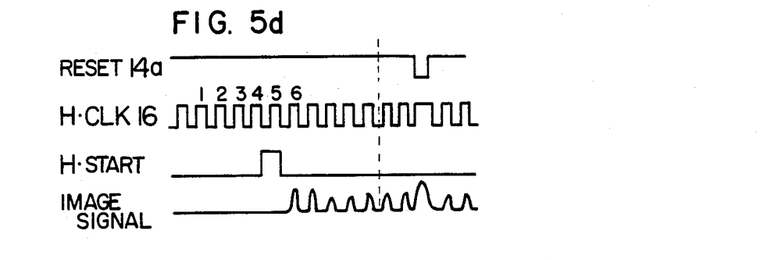

Suppose that the phase of the reset pulse 14a shown in FIG. 3 lies outside of the horizontal blanking period $T_{BLK}$ as shown in FIG. 5d. In such a case, a variation occurs in the pulse width of the horizontal clock pulse signal 16 in a range outside of the horizontal blanking period $T_{BLK}$ as shown in FIG. 5d, because the signal 16 is generated under control of the oscillator 15 by the reset pulse 14a. Such a variation of the pulse width of the horizontal clock pulse signal results in a phase shift of the image output signal from the image sensing device and results also in a variation of the level of the image signal read out from the picture elements. For example, the level of the signal portion corresponding to the larger pulse width in the horizontal clock pulse signal 16 is higher than the other signal portions, as seen in FIG. 5c. When such an abnormal signal portion of the output from the image sensing device appears outside of the horizontal blanking period $T_{BLK}$, a vertical line will be observed on the screen of the CRT of the television receiver. Therefore, the phase of the reset pulse 14a should be set to lie within the horizontal blanking period $T_{BLK}$, so that such a vertical line may not appear on the screen.

According to the present invention, the phase of the horizontal clock pulse signal 16 is controlled to be maintained constant in each horizontal period as described already with reference to FIG. 3, so that no variation occurs in the picture position not only when the frequency of the horizontal clock pulse signal 16 is integer times as high as $f_H$, but also when it is not necessarily integer times as high as $f_H$. Therefore, the horizontal clock pulse frequency can be freely selected. When the horizontal clock pulse oscillator 15 in the present invention is so controlled as to cease its oscillation on reset within the horizontal blanking period, appearance of a picture variation on the screen of the CRT due to a momentary variaton of the period of the horizontal clock pulse signal 16 can be avoided. To this end, the signal generation timing of the decoder 13 is so designed that the reset pulse 14a shown in FIG. 3 is generated within the horizontal blanking period.

In FIG. 4a, there is shown the structure of one form of the horizontal clock pulse oscillator 15 shown in FIG. 2. Referring to FIG. 4a, the oscillator 15 includes a known digital circuit 47 called a Schmitt trigger 2-input NAND gate, a resistor 48 and a capacitor 49 connected as shown. The reset pulse signal 14a shown in FIG. 3 is applied to the input terminal 50 of the NAND gate 47. The oscillator 15 oscillates when the input signal 14a is in its "1" level and ceases to oscillate as soon as the input signal level turns into its "0" level. Thus, the output signal 16 has the waveform shown in FIG. 3 or 4b.

Figure 6:
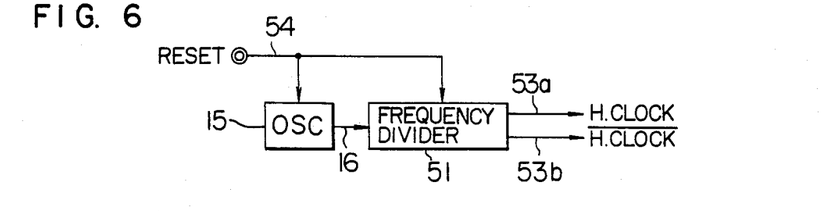
FIG. 6 is a block diagram showing the structure of a circuit generating a horizontal clock pulse signal of two phases.
Figure 7A:
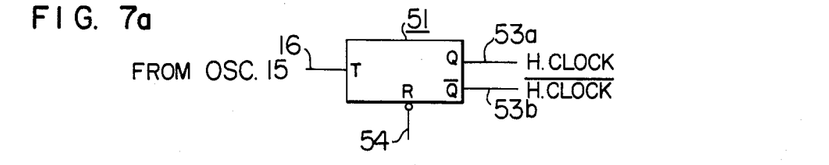
FIG. 7a is a circuit diagram of one form of the frequency divider shown in FIG. 6.
Figure 7B:
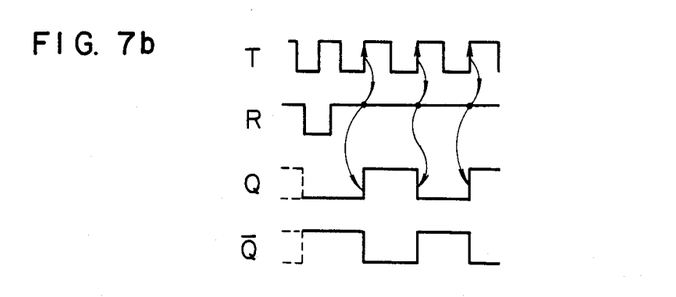

FIG. 6 shows the structure of another form of the horizontal clock pulse generating circuit according to the present invention. In the form shown in FIG. 6, the frequency of the output signal 16 from the oscillator 15 is divided by a frequency divider 51 to generate a two-phase horizontal clock pulse signal. This frequency divider 51 is in the form of a T flip-flop as shown in FIG. 7a, and FIG. 7b is a waveform diagram illustrating the operation of the flip-flop shown in FIG. 7a. It will be seen that two output pulses 53a and 53b of "1" and "0" levels respectively appear from the flip-flop in response to the rising timing of the input pulse 16 applied to the T terminal when the input pulse 54 applied to the R terminal is in its "1" level.

Figure 8:
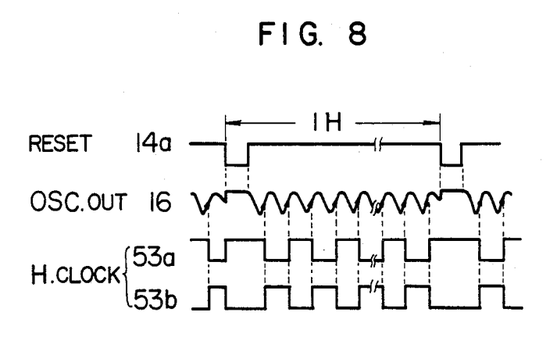
FIG. 8 is a waveform diagram illustrating the operation of the horizontal clock pulse generating circuit shown in FIG. 6.

The operation will now be described when the frequency divider 51 is a factor-of-2 frequency divider to generate two-phase horizontal clock pulses 53a and 53b. FIG. 8 shows the operating waveforms of the circuit shown in FIG. 6. The frequency divider 51 shown in FIG. 6 is in the form of a frequency dividing circuit provided with a so-called reset function, and the reset pulse signal 14a shown in FIG. 3 is applied to the frequency divider 51 besides the oscillator 15. The frequency divider 51 is constructed so that it is reset in response to the "0" level of the reset signal 14a and starts its frequency dividing operation in response to the rising edge of the clock input (the output from the oscillator 15) shown by the arrow in FIG. 8. When so constructed, the two-phase horizontal clock pulses 53a and 53b are generated from the frequency divider 51. The frequency divider 51 of such a structure is well knwon in the field of digital circuits.

It will be apparent from FIG. 8 showing the operating waveforms of the two-phase clock pulse generating circuit shown in FIG. 6, the circuit shown in FIG. 6 may be used in FIG. 2 to achieve the same effect that the phase of the horizontal clock pulse signal is maintained constant in each horizontal period.

Figure 9:
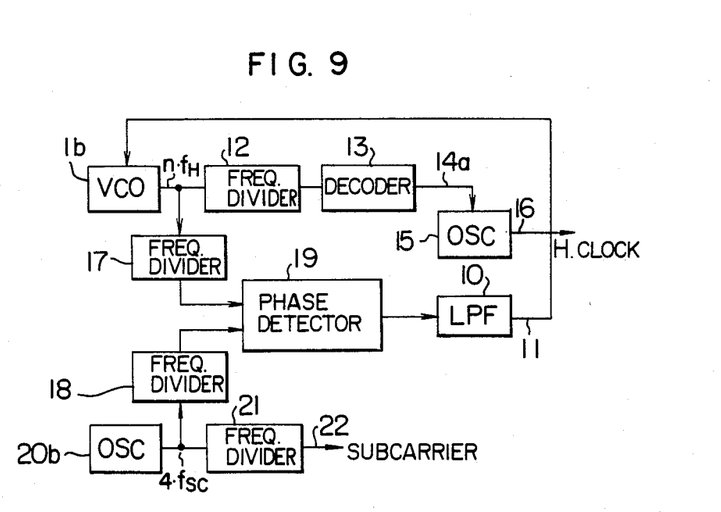
FIG. 9 is a block diagram showing the structure of another embodiment of the synchronizing signal generating circuit according to the present invention.

FIG. 9 shows the structure of another embodiment of the synchronizing signal generating circuit according to the present invention. In FIG. 9, the same reference numerals are used to designate the same parts appearing in FIG. 2. In FIG. 9, the oscillator 1 shown in FIG. 2 is replaced by a VCO 1b oscillating at an oscillation frequency which is n(n: an integer) times as high as $f_H$, the VCO 20 is replaced by a 4·$f_{sc}$ oscillator 20b, and an oscillation frequency controlling voltage 11 obtained in a manner as described with reference to FIG. 2 is applied to the oscillator 1b to stabilize the oscillation frequency of the oscillator 1b. The remaining parts operate in the same manner as that described with reference to FIG. 2. In the circuit shown in FIG. 9, the oscillator 20b acts as a basic unit controlling the oscillation frequency, and the oscillation frequency of this oscillator 20b is set at 17.734475 MHz which is 4 times as high as the subcarrier frequency $f_{sc}$. The numerical values used for the explanation of the operation of the circuit shown in FIG. 2 will be also used herein. The center frequency $\overline{f_1}$ of the output signal from the oscillator 1b is controlled to be $$\overline{f_1} = \frac{17.734475}{648} \times 644 \approx 17.625003 \text{ (MHz)}$$

and the horizontal frequency $f_H$ is given by $$f_H = 15.6250026 \text{ (kHz)}$$

The difference between this value and a horizontal frequency $f_H$ (15.625 kHz) of the PAL system is only about 0.0026 Hz, and such a very slight difference does not pose any practical problem. Further, the oscillator or horizontal clock pulse generating circuit described with reference to FIGS. 4a and 6 can also be applied to the circuit shown in FIG. 9 as effectively as the application to the circuit shown in FIG. 2.

The oscillation frequencies of the oscillators 1, 1b, 20, and 20b, and the frequency dividing factors of the frequency dividers 17, 18 and 21 are in no way limited to the numerical values above described. For example, the oscillation frequency of the oscillators 1, 1b may be selected to be 282 times as high as $f_H$, and the frequency dividing factor of the frequency divider 17 may be selected to be 161 to achieve the effect similar to that exhibited by the first embodiment.

While the foregoing description has referred to an application of the present invention to the PAL system, it is apparent that the present invention is also easily applicable to the NTSC system. For example, when the oscillation frequency of the oscillator 1 in FIG. 2 is selected to be 260 times as high as the NTSC horizontal frequency, and the frequency dividing factors of the frequency dividers 17 and 18 are selected to be 184 and 644 respectively, the center frequency of the oscillation output signal from the oscillator 20 has the value which is 910 times as high as the horizontal frequency, and the division of the frequency of the oscillation output signal from the oscillator 20 by the factor of 4 by the frequency divider 21 provides the subcarrier frequency of the NTSC system. Other circuit operations are similar to those described for the PAL system.

In the case of the NTSC system, it is apparent from the description of the prior art circuit shown in FIG. 1 that the oscillation frequency of the oscillator 1 in FIG.

2 may be selected to be 910 times as high as the horizontal frequency $f_H$, and the subcarrier may be obtained by directly dividing the frequency of the oscillation output signal from the oscillator 1. While in this invention, the reset pulse with the same frequency as the horizontal frequency which is obtained by dividing the frequency of the output of the oscillator 1 or 1b oscillating at a frequency of an integer multiple of the horizontal frequency is used for controlling the phase of the oscillation signal of the oscillator 15 shown in FIGS. 2 and 9. Another prior art system is disclosed in the Japanese Utility Model Laid-Open No. 56270/81 laid open on May 15, 1981 in which instead of above reset pulse, a pulse signal with a horizontal frequency from a horizontal frequency oscillator is used. In the circuit of the prior art system, no frequency dividers are needed since the horizontal frequency signal is directly obtained from a horizontal frequency oscillator. With application of the prior art circuit configuration in a color video camera, it is difficult to obtain a stable frequency relation between the horizontal and the subcarrier frequency as settled in the above-mentioned television system if the horizontal and the subcarrier frequency signals are independently generated from each other.

If the subcarrier oscillator and the horizontal frequency oscillator are combined through a phase lock loop to stable the frequency relation therebetween, a frequency divider is necessary to be provided disadvantageously.

It will be understood from the foregoing detailed description that the synchronizing signal generating circuit according to the present invention comprises an oscillator generating an oscillation output signal having a frequency which is n(n: an integer) times as high as the horizontal frequency $f_H$, and another oscillator generating an oscillation output signal providing the subcarrier. One of the oscillators is in the form of a VCO, and the other is used to lock the oscillation frequency of the VCO. Therefore, a highly stable relation is maintained between the horizontal frequency and the subcarrier frequency. Further, the horizontal frequency pulse signal derived from the oscillation output signal from the $n \cdot f_H$ oscillator is applied to another oscillator generating a horizontal clock pulse signal, so that the oscillation phase of the horizontal clock pulse oscillator can be maintained constant in each horizontal period, and displacement in the position of a reproduced picture on the screen of a CRT may not occur even when the frequency of the horizontal clock pulse signal is freely selected. Therefore, the number of required picture elements of the solid-state image sensing device can be made smaller than hitherto, and a solid-state image sensing device having the same number of horizontal picture elements as that used for the NTSC system can also be used for the PAL system. Thus, a consumer-use solid-state color video camera of PAL type can be easily provided.

Further, when the frequency of the oscillation output signal from the horizontal clock pulse oscillator is divided to generate the horizontal clock pulse signal, the frequency divider providing the horizontal clock pulse signal is reset in each horizontal period while controlling the operation of the horizontal clock pulse oscillator to achieve the effect of the present invention. Furthermore, according to the present invention, the horizontal clock pulse oscillator and the frequency divider are controlled in the horizontal blanking period so that the control may not adversely affect reproduction of pictures.

We claim:

1. A synchronizing signal generating circuit for a solid-state color video camera comprising first oscillator means for generating an oscillation output signal having a frequency which is n (n: an integer) times as high as the horizontal frequency, and first frequency divider means for dividing the frequency of the oscillation output signal from said first oscillator means to produce a pulse signal having a recurrence frequency equal to the horizontal frequency, said circuit further comprising second oscillator means for generating a horizontal scanning clock pulse signal for a solid-state image sensing device, said pulse signal having the recurrence frequency equal to the horizontal frequency being used to reset the oscillating operation of said second oscillator means, so that the horizontal scanning clock pulse signal can be controlled to be maintained at the same fixed phase in each horizontal period.

2. A synchronizing signal generating circuit as claimed in claim 1, further comprising second frequency divider means for dividing the frequency of the oscillation output signal from said first oscillator means by the factor of l (l: an integer), third oscillator means for generating an oscillation output signal having a frequency which is p (p: an integer) times as high as the subcarrier frequency, third frequency divider means for dividing the frequency of the oscillation output signal from said third oscillator means by the factor of q (q: an integer), phase detector means for the phase detection of the output signal from said second frequency divider means and the output signal from said third frequency divider means, low-pass filter means for passing the low frequency band of the output signal from said phase detector means, one of said first oscillator means and said third oscillator means being in the form of voltage controlled oscillator means, the output signal from said low-pass filter means being used to control said voltage controlled oscillator means, so that the ratio between the oscillation frequency of said first oscillator means and that of said third oscillator means can be locked at a value which is an integer.

3. A synchronizing signal generating circuit as claimed in claim 2, wherein said second oscillator means includes fourth frequency divider means whose frequency dividing function is enabled and disenabled under control of a control signal, and the frequency dividing operation of said fourth frequency divider means is temporarily stopped with the same timing as the timing of controlling said second oscillator means by said pulse signal having the recurrence frequency equal to said horizontal frequency.

4. A synchronizing signal generating circuit as claimed in claim 2, wherein said second oscillator means is controlled within the horizontal blanking period by said pulse signal having the recurrence frequency equal to said horizontal frequency.

* * * * *